C. H. GIESE.
WATER HEATING APPLIANCE FOR GAS STOVES.
APPLICATION FILED NOV. 4, 1914.
1,129,566.
Patented Feb. 23, 1915.
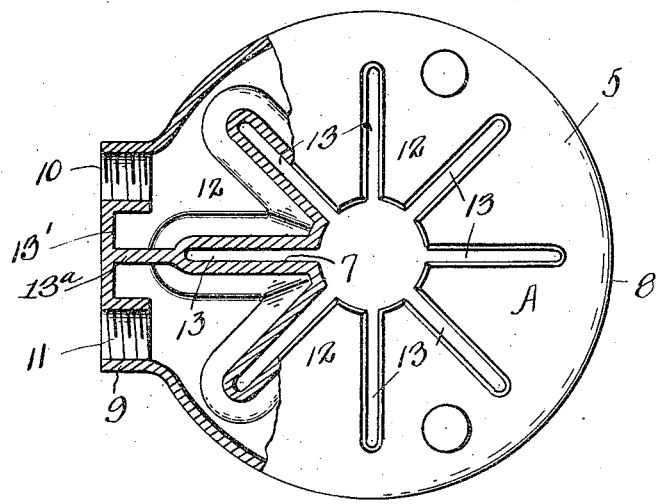
Fig. 1.
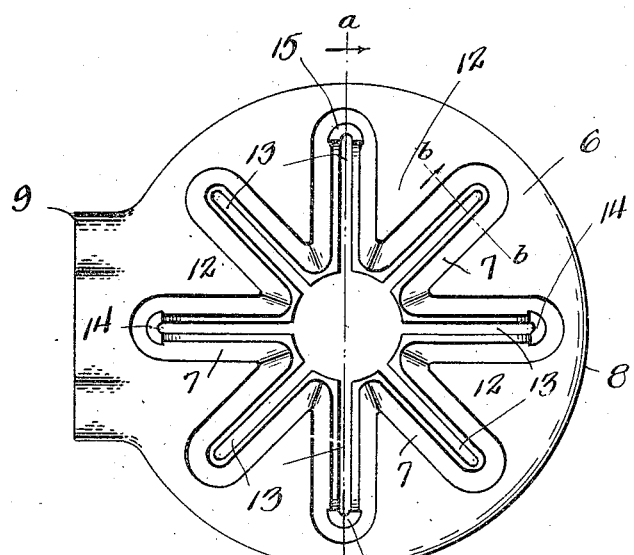
Fig. 2.
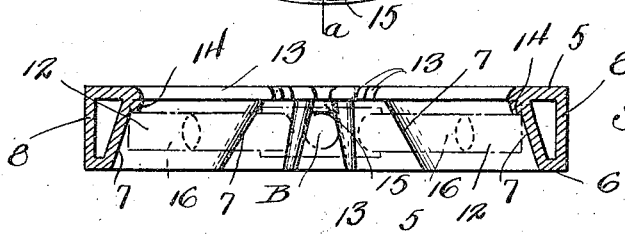
Fig. 3.
Fig. 4.
Witnesses
Henry D. Huntemann
H. Rathvon
Inventor
Chas. H. Giese

UNITED STATES PATENT OFFICE.

CHARLES H. GIESE, OF NEWARK, NEW JERSEY.

WATER-HEATING APPLIANCE FOR GAS-STOVES.

1,129,566.   Specification of Letters Patent.   Patented Feb. 23, 1915.

Application filed November 4, 1914. Serial No. 870,265.

*To all whom it may concern:*

Be it known that I, CHARLES H. GIESE, a citizen of the United States, residing at Newark, in the county of Essex and State of New Jersey, have invented certain new and useful Improvements in Water-Heating Appliances for Gas-Stoves, of which the following is a specification.

This invention relates to water heating appliances for gas stoves or the like.

One object is to provide an appliance which may be readily applied to a gas stove or the like for the purpose of heating water which may be utilized for heating, washing or other purposes.

Another object resides in the provision of a water heating appliance which may be applied to a gas stove or the like and which is particularly adapted for heating water while the stove is being utilized for cooking purposes without interfering in the least with the cooking operation.

A still further object is to provide a water heating appliance applicable to gas or like stoves and constructed whereby water may be effectually heated by heat from the stove whether the stove be employed for cooking purposes or solely for the purpose of heating the water.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings: Figure 1 is a top plan view partly in section. Fig. 2 is an inverted plan view. Fig. 3 is a sectional view on the line $a$—$a$ of Fig. 2. Fig. 4 is a fragmentary sectional view on the line $b$—$b$ of Fig. 2.

Referring now more particularly to the accompanying drawings, my improved appliance is composed of a hollow casing A, of aluminum or other suitable material, including a top wall 5, a bottom wall 6, and inner and outer walls 7 and 8. The outer wall is preferably annular in form, save for a projection 9 which is provided with inwardly directed interiorly screw threaded bosses 10 and 11 designed for the purpose of coupling inlet and outlet pipes (not shown) to the heating appliance.

The inner wall of the casing A is preferably of more or less irregular shape or otherwise formed so as to provide a plurality of radial hollow water passages 12. These passages are spaced to provide for the formation of spaced radial slots 13 whose outer ends terminate short of the outer edges of the casing and which are overhung slightly at their outer ends and sides by the top 5. The top also overhangs slightly the inner ends of said water passages.

The inner wall 7 and the side walls of the passages 12 are preferably inclined, as shown. Saddles 14 and 15 are located in alternate slots and preferably at the outer ends of such slots 13 and are designed to seat the casing A on the corresponding radial arms 16 of the burner B.

A partition 13$^a$ connects the front wall 13′ of the projecting portion 9 of the casing A and the inner wall of the casing so that as the water enters the casing through the inlet 10 it is caused to pass in one direction entirely around the casing through the various passages 12 and out through the outlet 11.

The bureau B is preferably of the star type. The flames from the burner pass through the slots 13 in the top 5 of the casing A for cooking purposes and these slots are preferably arranged to permit passage of the flames from the burner without the flames contacting with the inclined walls of the passages 12. The flames thus contact directly with the cooking vessels arranged over the heating appliance and these flames are therefore not decreased in their intensity as they would be if they contacted with the walls of the passages 12. The heat radiating from the flames during their passage through the slots is sufficient to heat the water in the casing A, the water in the casing being separated from the flame by relatively thin walls or radiating surfaces throughout the entire structure of the appliance.

What I claim as new and desire to secure by Letters Patent is:

1. In an appliance of the character described, a casing having inlet and outlet openings and spaced radial water passages and intervening radial slots, the slots terminating short of the outer edge of the casing, the walls of the water passages being inclined, saddles disposed at the outer ends of alternate slots and under the top of the casing, and a burner having radial arms, the terminals of some of which receive said saddles whereby the casing is supported upon the burner and whereby the flames from the burner will pass through the slots in the casing out of contact with the inclined walls of the water passages.

2. In an appliance of the character described, a casing including inner and outer walls, the latter having a projection, and inwardly directed inlet and outlet bosses located within said projection, the inner wall being formed to provide spaced water passages with intervening slots, the slots of the water passages being inclined and the top of the casing overhanging the sides of the slots and rounded at said overhanging portions, saddles located at the outer ends of the slots and under the top of the casing, a partition arranged between said inlet and outlet bosses and connecting said inner and outer walls between said projection and the adjacent water passage, and a burner having arms to receive said saddles so as to support the casing on the burner.

3. In an appliance of the character described, a casing including inner and outer walls, the latter having a projection, and inwardly directed inlet and outlet bosses located within said projection, the inner wall being formed to provide spaced water passages with intervening slots, the walls of the water passages being inclined and the top of the casing overhanging the sides of the slots and rounded at said overhanging portions, saddles located at the outer ends of the slots and under the top of the casing, and a burner having arms to receive said saddles.

In testimony whereof I affix my signature in presence of two witnesses.

CHARLES H. GIESE.

Witnesses:
FRED PROUT,
HENRY W. EGNER, Jr.

Copies of this patent may be obtained for five cents each, by addressing the "Commissioner of Patents, Washington, D. C."